(No Model.)  2 Sheets—Sheet 1.

F. W. KENDALL.
LIQUID DISTRIBUTER.

No. 402,841. Patented May 7, 1889.

WITNESSES:

INVENTOR.
F. W. Kendall
per O. E. Duffy
Attorney (No Model.) 2 Sheets—Sheet 2.

F. W. KENDALL.
LIQUID DISTRIBUTER.

No. 402,841. Patented May 7, 1889.

WITNESSES
E. C. Duffy
H. E. Peck

INVENTOR
F. W. Kendall
per O. E. Duffy
Attorney

UNITED STATES PATENT OFFICE.

FESTUS WILLIAM KENDALL, OF SWARTWOOD, NEW YORK.

LIQUID-DISTRIBUTER.

SPECIFICATION forming part of Letters Patent No. 402,841, dated May 7, 1889.

Application filed June 28, 1888. Serial No. 278,456. (No model.)

*To all whom it may concern:*

Be it known that I, FESTUS WILLIAM KENDALL, of Swartwood, in the county of Chemung and State of New York, have invented certain new and useful Improvements in Liquid-Distributers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in liquid-distributing machines, and more particularly to that class of machines for spraying liquid poison upon vegetation to destroy insect life.

The object of my invention is to provide an improved liquid-distributer which shall be more simple and durable in construction and more effective in operation than the devices of this class heretofore in use, and thus reduce the cost of the device to a minimum and bring it within the reach of the average farmer.

With these ends in view my invention consists in certain novel features of construction and combinations of parts, more fully described hereinafter, and particularly pointed out in the claims.

Figure 1:
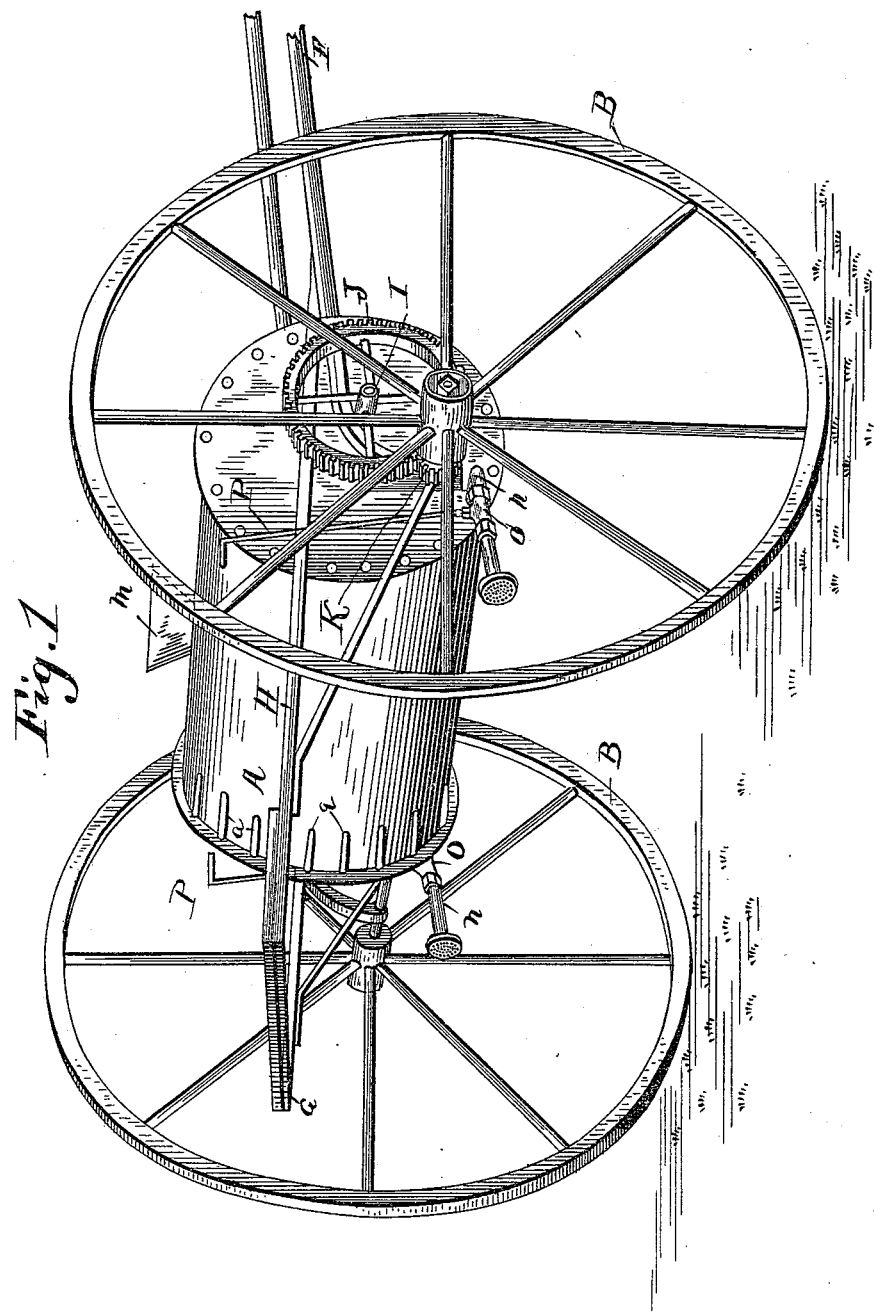
Figure 2:
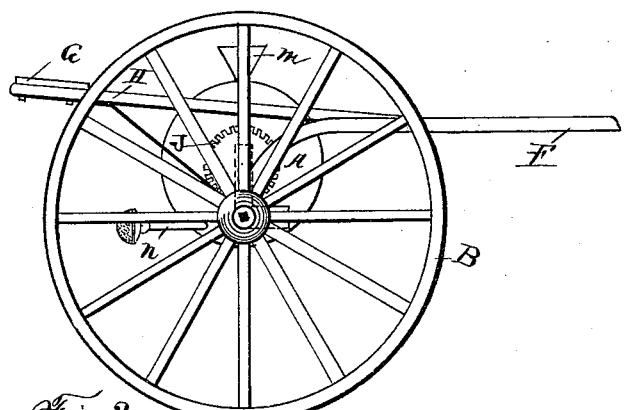
Figure 3:
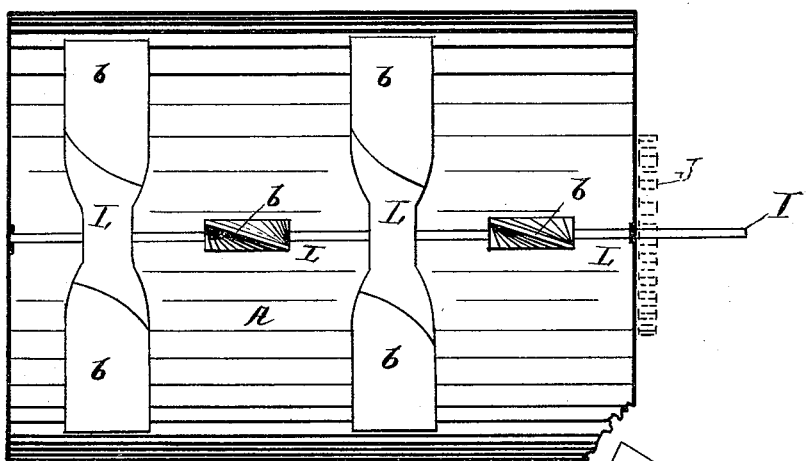
Figure 4:
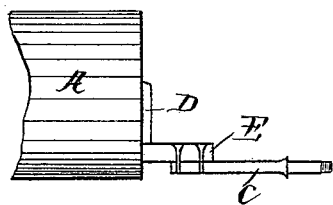
Figure 5:
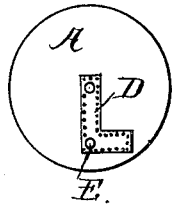
Figure 6:
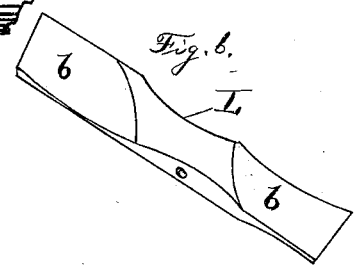

Referring to the accompanying drawings, Figure 1 is a perspective view of the complete device. Fig. 2 is an end view of the same. Fig. 3 is an enlarged detail sectional view of the tank, showing the agitators which revolve within the same. Figs. 4 and 5 are respectively a side and end view of one end of the tank detached, showing the manner of attaching the axle-stub to the same; and Fig. 6 is a detail perspective view of one of the agitators or blades.

In the drawings, the reference-letter A indicates a reservoir or supply-tank, preferably composed of a cylindrical metallic shell having heads, preferably composed of wood, secured to the ends of the shell by stay-bolts $a$, passing through the heads and firmly riveted to the cylindrical shell or body, said heads being prevented from splitting or warping by having iron hoops or bands shrunk around them.

The tank is supported by means of wheels B, journaled on the axle-stubs C, which are secured to the heads of the tank by means of L-shaped or angular castings D, bolted or otherwise secured to the heads of the tank, (see Figs. 4 and 5,) and provided with laterally-extending arms E, to which the axle-stubs are suitably clipped, as clearly shown in Fig. 4.

I indicates an agitator-shaft longitudinally and horizontally extending through the tank, journaled in the heads of the same, and extending through the head at one end. A gear-wheel, J, is mounted upon said extended end of the agitator-shaft, and meshes with a pinion, K, secured to and rotating with the wheel B at that end of the tank.

Within the tank there are preferably eight (a greater or less number can be used) paddles, blades, or wings, L, secured to the agitator-shaft and extending radially from the same in opposite directions, as shown. The outer ends of these paddles are beveled laterally on both sides and in opposite directions, as shown at $b$—*i. e.*, the alternate paddles on one side of the shaft are beveled in the same direction, while the intervening paddles are beveled in the opposite direction. The end paddles are beveled to throw the solution in the tank toward the center, while the center paddles throw it toward the ends. Thus it will be seen that as the device is drawn forward the agitators revolve and the end paddles force the solution toward the center, while the next following paddles force it toward the ends, thereby keeping the solution in motion endwise of the tank as well as around it, and keeping the liquid and poison or other ingredient thoroughly and constantly mixed.

The liquid and other ingredients are placed in the tank through a suitable opening, M, and are discharged from the same through one or more pipes, N, extending from the heads of the tanks and then at right angles directly to the rear, and are provided upon their outer ends with suitable rose or sprinkler heads, as shown, and which, if desired, can be adjustably secured to pipes N by elbows or movable joints. Said pipes N are also provided with cut-off valves or gates O, operated by rods P, extending upwardly beside the tank and provided with suitable handles at their upper ends within easy reach from the driver's seat G, whereby the discharge of liquid from the rose-heads can be stopped or started, as desired. The thills F are preferably secured to the axle-stubs, and the driver's seat G is supported at the rear of the tank by supports H, extending forwardly and secured to said thills.

It is evident that the apparatus herein described and shown is exceedingly simple and durable in construction, and can be manufactured and sold at a minimum cost. One or more rows of vegetables can be sprinkled by the device, and it possesses numerous other advantages.

As the tank forms a part of the fixed axle, the agitators can be operated by a spur-gear and pinion, thereby greatly reducing the cost and doing away with the expense of a revolving axle and a system of gears and clutches.

What I claim is—

1. In a liquid-distributer, the combination of a horizontal tank carried by suitable supporting-wheels and provided with one or more discharge-pipes, a horizontal agitator-shaft extending through the interior of the tank, gearing to drive the shaft, and a series of paddles secured to and extending radially from said shaft, the outer ends of said paddles being beveled laterally on both sides and in opposite directions, and every alternate paddle in the line of rotation being beveled in the same direction and the intervening paddles beveled in the opposite direction, for the purpose set forth.

2. In a liquid-distributer, the combination, with supporting-wheels, of a cylindrical tank horizontally located between said wheels and composed of a metallic cylindrical shell, and wooden heads secured to the cylinder by bolts passed through the head and riveted to the face of the cylinder, a discharge-pipe, a horizontal shaft extending through the tank and provided with paddles, and gearing whereby the same is driven from one of the supporting-wheels, substantially as described.

In testimony that I claim the foregoing as my own I affix my signature in presence of two witnesses.

FESTUS WILLIAM KENDALL.

Witnesses:
GEORGE GATES,
T. P. HAMLIN.